INVENTOR.
NORMAN M. IMBERTSON
BY
Huebner & Worrel
ATTORNEYS.

March 16, 1965 N. M. IMBERTSON 3,173,269
COLLAPSIBLE DAM
Filed Oct. 13, 1961 9 Sheets-Sheet 8

INVENTOR.
NORMAN M. IMBERTSON
BY
*Huebner & Worrel*
ATTORNEYS.

March 16, 1965 N. M. IMBERTSON 3,173,269
COLLAPSIBLE DAM
Filed Oct. 13, 1961 9 Sheets-Sheet 9

INVENTOR.
NORMAN M. IMBERTSON
BY
*Huebner & Worrel*
ATTORNEYS.

United States Patent Office 3,173,269
Patented Mar. 16, 1965

3,173,269
COLLAPSIBLE DAM
Norman M. Imbertson, 1020 Inverness Drive,
Pasadena, Calif.
Filed Oct. 13, 1961, Ser. No. 148,007
7 Claims. (Cl. 61—30)

This application constitutes a continuation-in-part of applicant's copending application bearing Serial No. 745,614, filed June 30, 1958, and now abandoned.

This invention relates to a collapsible dam comprising a plastic, rubber or treated fabric sheet material formed into an envelope or bag and filled with water, liquids, or gases under sufficient pressure that the inflated envelope or bag forms an effective barrier or dam across a stream, channel or dam site.

An object of the invention is to provide a dam of the character identified which is especially adapted for operation in conjunction with a low flow as, for example, may occur in flood control channels or rivers during the low run-off period. In certain areas it is desirable to conserve as much water as possible from this source by backing it up in the channel or river until sufficient volume is attained for efficient diversion of the accumulated water into storage or water basins.

One serious difficulty encountered in the past has been the safety requirement that dams installed in flood control channels or the like must not be permanent. For that reason somewhat flimsy wooden structures or earth fill structures with wooden spillways have heretofore been employed which will wash out under flood conditions so that the flow of water through the channel is relatively unimpeded. In addition to other deficiencies presented by the temporary wooden dams it is obvious that they have to be rebuilt after a flood has washed them out.

A primary object of the present invention thus is to provide a collapsible dam for installation in flood control channels and the like which will adequately function to dam, or check, or divert water of a relatively low head, but which dam will flatten out under the action of a high water head such as may be created by flood conditions, and which will lie flat on the bed of the channel until the flood condition has passed. Such dam may be then reinflated either under manual or automatic control and thus be reconstituted for its conventional use under normal run-off conditions.

A further object of the invention is to provide a collapsible dam of the character identified which is simple in construction, relatively inexpensive and relatively easy to install.

Further objects of the invention involve means for inflating the dam and means for maintaining the proper water, liquid or gas pressure in the dam.

Still another object is to provide means for deflating the dam under action of an excessive head of water in the dammed channel.

An additional object of the invention is to provide a structure of the character described suitable for replacing a taintor gate in a dam spillway.

A still further object is to provide a dam of the character identified which embodies means for automatically inflating the same initially or succeeding the deflating of the dam by reason of flood conditions.

A still further object of the invention is to provide a collapsible dam which may be employed independently of channel walls for the purpose of diverting or dividing a column of water from its normal course.

Another object of the invention is to provide a collapsible dam across an unpaved channel by first constructing a cut-off wall across the channel and extending it up the banks on the slope required; said cut-off to be of sufficient depth to keep from being washed out and of a width sufficient to anchor the upper edges of the dam to it.

Another object of the invention is to provide a pair of collapsible dams spaced one from the other whereby the dams may be filled and emptied so as to form water locks.

Another object of the invention is to provide a collapsible dam that is fitted within a sluiceway which may extend through a dam at stream bed level.

How the above, and other objects of my invention are achieved will be more readily understood by reference to the following description and to the annexed drawings, in which.

Figures 1, 1A, 2, 3, 4:
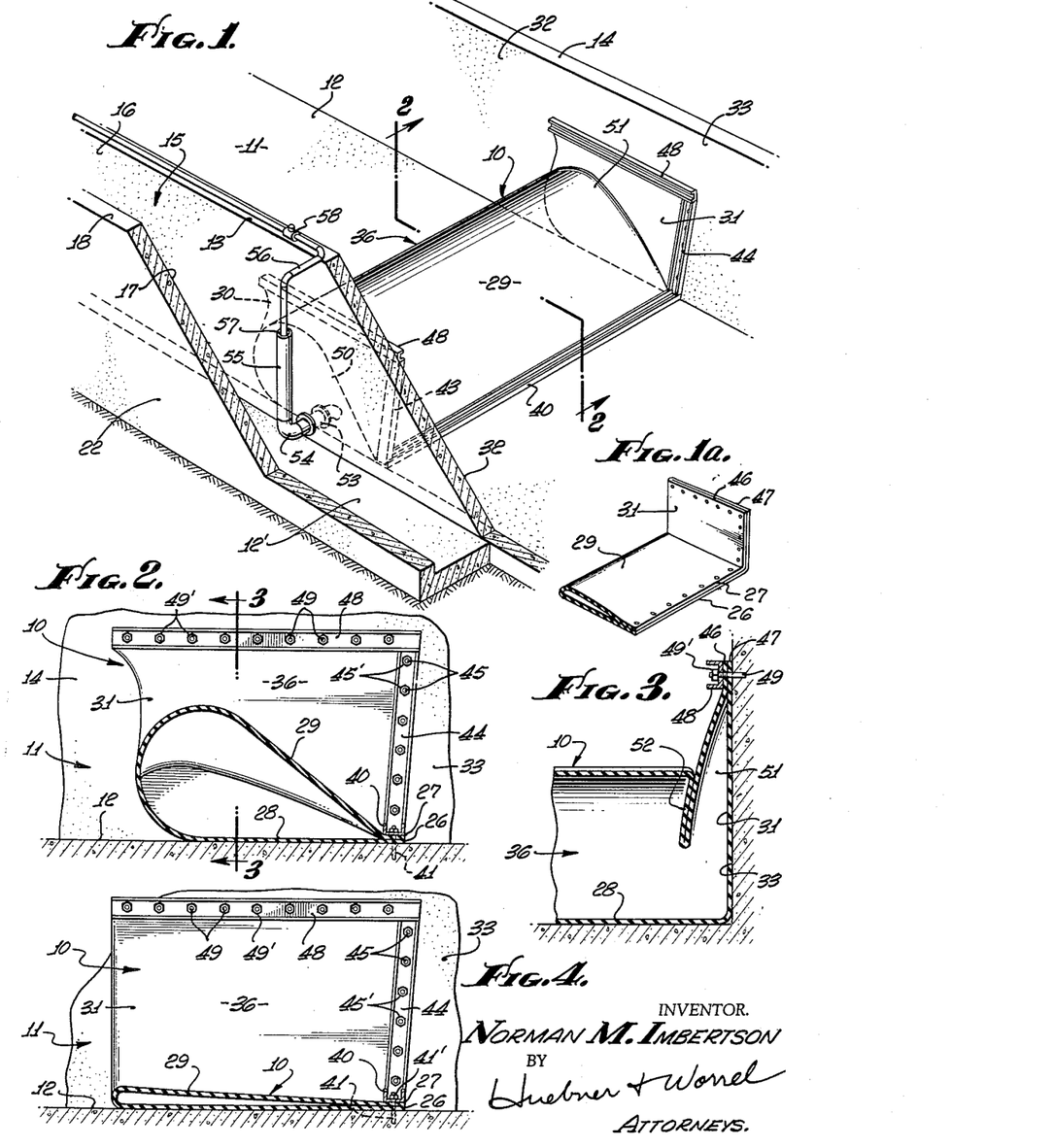
FIGURE 1 is a side perspective view showing a collapsible dam positioned in a water course or channel in inflated condition, and means for inflating and deflating the dam.
FIGURE 1a is a perspective cut-away view of the dam in a collapsed condition.
FIGURE 2 is a cross section taken on line 2—2 of FIGURE 1.
FIGURE 3 is a fragmentary sectional view taken on line 3—3 of FIGURE 2 showing the end construction of the dam when inflated.
FIGURE 4 is a cross section, similar to FIGURE 2, of the dam when it is collapsed.

Referring to FIGURE 1, there is shown my collapsible dam generally designated 10 in an inflated position for damming a water head. The dam 10 is secured in a water channel or course generally designated 11. The channel can be artificially created by concrete, asphalt or the like or can be a natural channel or course. For purposes of illustration the water channel 11 is shown as being lined with concrete and having a bottom 12 of generally flat, smooth surface and two generally flat vertical side walls 13 and 14 and imparting to the channel a generally U-shaped cross section. An auxiliary concrete lined channel 15 may be provided, as shown in the drawings, adjacent and parallel to the main channel 11 and has an outlet (not shown) into the main channel downstream of the dam. The auxiliary channel 15 includes a bottom 12', which is in effect a marginal extension of the bottom 12. The auxiliary channel 15 is further defined by the outer face 16 of the wall 13 and the inner face 17 of an approximately vertical wall 22. The function of this auxiliary channel 15 will be discussed later. It is not necessary under all conditions.

The dam is fabricated from a pliable and waterproof, or at least water resistant, sheet material. By way of example, and not of limitation, I have found to be satisfactory a sheet of "neoprene" treated "nylon," rubberized or plastic treated canvas, rubber latex, or the like. The structure is initiated by a generally rectangular sheet of the selected material and in one dimension at least should be longer than the width of the channel floor or bottom 12 for reasons which will appear. With one edge 26 positioned upon the bottom 12 of the channel and a lower half 28 of the sheet resting upon the bottom, an upper half 29 is folded over so that edge 27 thereof is contiguous to and aligned with the edge 26 as, for example, is shown in FIGURE 4. These edges 26 and 27 may be vulcanized together but I have found this not to be necessary if the proper clamping means as hereinafter described are employed. The juncture of the edges 26 and 27 is at the upstream side of the dam.

The folding over of the material as described forms an open ended tube or envelope with its double walled end extensions 30 and 31 disposed upwardly and against the opposite faces 32 and 33 of the side walls 14 and 13. The length of the envelope relative to the width of the channel should be such that the folded up ends of the envelope reach a height on the channel walls higher than the greatest vertical dimension of the distended envelope as, for example, is shown in FIGURE 2. The envelope when in place and with its ends mounted to the walls as hereinafter described becomes a closed bag 36 adaptable to inflation by water, other liquids, or gases.

The lower transversely positioned edges 26 and 27 are clamped against the flat bottom of the channel or cut off wall by a cleat 40 preferably of channel section for strength and rigidity, the said cleat being firmly held down against the envelope material by threaded studs 41 securely imbedded in the concrete bottom and projecting upwardly through registering apertures in the cleat 40, nuts 41' being threaded on the studs.

The edges 26 and 27 of the envelope material which extend beyond the ends of the cleat 40 are brought together and clamped against the vertical side walls of the channel by means of cleats 43 and 44 which are preferably of the same cross sectional construction as the cleat 40 and are attached by threaded studs 45 and nuts 45' which are similar to the studs 41 and nuts 41'.

It has been found preferable to slant the cleats 43 and 44 off true perpendicular so that the tops are located slightly upstream. This is for the purpose of reducing stresses in the bag when inflated without the water behind the dam to form a more wrinkle proof auxiliary end bag as will further subsequently appear.

The end edges 46 and 47 which are identical at the opposite ends of the envelope 36 are brought together and clamped in a horizontal elevated position to the side walls of the channel by means of a cleat 48 secured to the walls preferably by threaded studs 49 anchored similarly to the studs previously described, with nuts 49' screwed on the studs.

The bag 36 is thus mounted in the channel in a manner by which it has become sealed all the way around and is adapted to be filled with water or other liquid or gas for the purpose of distending it from the flat inactive condition illustrated in FIGURE 4 to the inflated operative condition illustrated in FIGURES 1 and 2. Furthermore the end extensions have become inflated auxiliary bags 50 and 51 reflecting the internal water pressure and fold against the end portions 52 of the inflated main bag, which takes the shape necessary to use up the excess material in the top of the bag at the ends when it is inflated. The auxiliary bags make a watertight wrinkle wtih the main bag, the whole providing, in effect, a continuous dam type obstruction extending from wall to wall of the channel.

Next to be described is one means for filling the bag 36. A pipe 53 is positioned through wall 13 near the bottom 12 of the channel 11 so that one end protrudes into the bag 36 and the other end is threaded or otherwise secured to an elbow joint 54 which extends upward into auxiliary channel 15. A standpipe 55 is threaded or otherwise secured to the elbow 55 and rises upward in the channel 15 generally vertical and terminates at a predetermined height, preferably somewhat above the top of the bag when fully inflated.

A fluid pipe 56 terminates just above the top 57 of the standpipe and a valve 58 is positioned in the pipe 56 to mechanically control the flow of water from pipe 56 into the standpipe and thence into the bag to fill it, as illustrated in FIGURES 1, 2 and 3.

With the advent of the flow of water into bag 36 the water will fill the main body of the bag, which is the part extending across the channel 11, and when it is filled water will enter auxiliary bags or pockets 50 and 51 formed by the end extensions 30 and 31 secured to walls 13 and 14. When the pockets 50 and 51 are filled they will press outward from the walls 13 and 14 against the main body of the bag forming a seal between contiguous surfaces of the main body and the extensions.

When inflated, the bag will ordinarily continue to function as a dam during the rise of channel water upstream of the dam to a height generally coincident with the upper end 57 of the standpipe 55. This standpipe height is usually fixed with regard to safety factors, to provide for collapse of the dam upon a water head corresponding to flood conditions.

Once inflated with water, the bag of the dam will ordinarily remain in operative condition so long as the head of water upstream of the dam is not appreciably greater than the height of the dam itself. The dam will even remain operative as such during some increase of the head behind the dam. At exactly what point the dam will begin to collapse under excessive head depends upon various factors including materials of which the dam is built, velocity of water flow, height of standpipe, and other factors. It has been found in an experimental installation that with the upper end of the standpipe approximately three and one-half feet above the height of the inflated bag, the bag will remain more or less fully inflated until the channel water has risen to a height of approximately two feet above the top of the dam. When this condition arose the dam began to deflate by reason of its water content being expelled through the upper end of the standpipe and this process continued until the dam was substantially flat, as shown in FIGURE 4. While in FIGURE 4 the envelope is shown as not fully deflated, in actual practice when water passes over the dam in the illustrated position the upper half 29 of the envelope 10 will be pressed flat and touch the lower half 28, and the thickness of the envelope will therefore only be twice the thickness of the thin sheet material. Thus it will be seen that the envelope will not materially impede the flow of water over the channel bottom. As a matter of fact the much smoother texture of the envelope as compared with the channel bed 11 will have the effect of reducing the opposition of the normally rough channel bed to the flow of water. The net result is that there is no appreciable retarding of flow of water over the envelope. Stated another way, the coefficient of friction of the flow of water over the envelope is less than the coefficient of friction over the channel bottom 12, which will compensate for the slight physical rise of the envelope above the surface of the channel bottom. It is my observation that such a function will occur so long as the upstream head of water remains at least substantially above the current top of the dam as when the deflating movement began. When flood conditions have subsided, if the valve and piping system shown in FIGURE 1 is in use, refilling must be accomplished by manual opening of the valve 58. Automatic refilling is discussed in some detail later in this description. Water discharged from the upper end of the standpipe 55 during deflation of the bag empties into the channel 15 and flows downstream where it may rejoin the main channel at any desired position, not shown.

Figure 5:
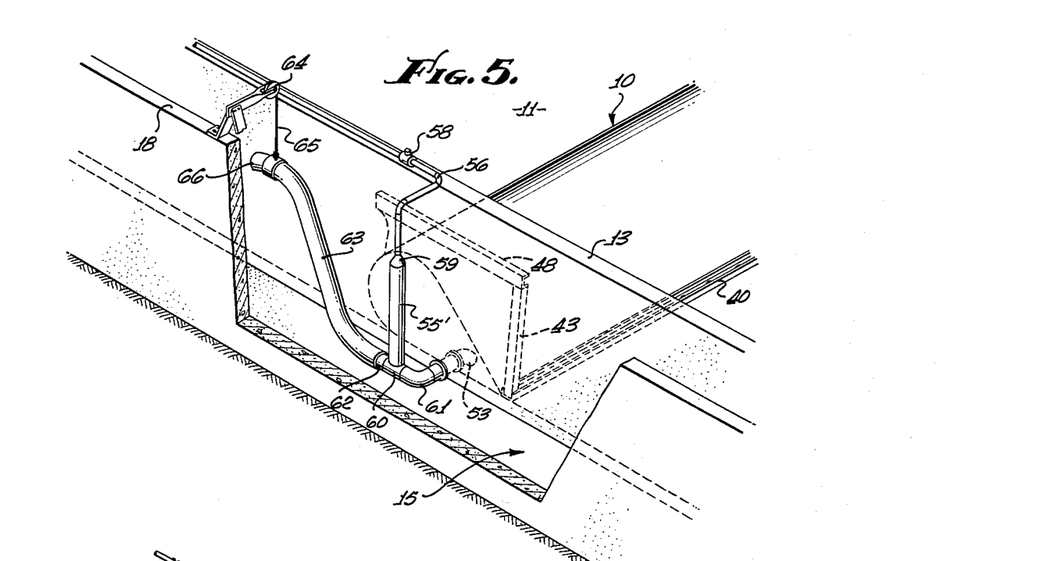
FIGURE 5 is a side perspective view illustrating a second means of deflating the dam.

FIGURES 5 through 8 illustrate modifications of means and methods for deflating the bag of the dam. In each of these systems a water supply pipe 56 provided with a valve 58 is employed for introduction of water to the interior of the bag, while in FIGURE 1 the water entered the open top of standpipe 55. In FIGURE 5 there is a closed connection 59 between the supply pipe 56 and standpipe 55'. Actually standpipe 55' need not be in the form shown, but may be merely a continuation of supply pipe 56. The same thing is true with relation to standpipe 55' in the form shown in FIGURES 6 and 8.

In FIGURE 5 a T connection 60 is secured to the lower end of the standpipe 55', one end of the T has a pipe connection 61 with inlet pipe 53 and the other end of the T has a nipple 62 which connects with a flexible hose 63.

A pulley mechanism 64 is mounted upon the top of auxiliary channel wall 18 and the hose suspending wire 65 is coupled to the hose as shown and the wire is carried over the pulley and may be secured by any desired means, not shown, for the purpose of maintaining the flexible hose at any desired elevation. Obviously such elevation may be altered as desired. The flexible hose ends at 66 adjacent its uppermost elevation. This flexible hose and the means for maintaining the discharge end thereof at varying elevations affords greater facility for fixing the height at which upstream water behind the dam will overcome the pressure inside the bag of the dam and start a collapse thereof. The bag of the dam may be completely deflated as, for example, shown in FIGURE 4, or partially deflated, depending upon the relative pressures in the dam and of the water head back of and over the dam.

Figure 6:
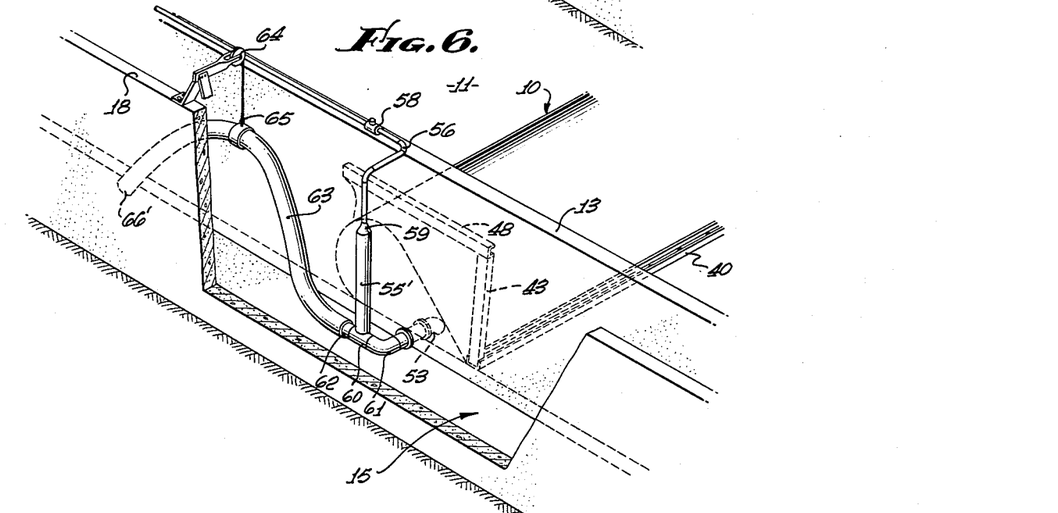
FIGURE 6 is a side perspective view illustrating a third means of deflating the dam.

FIGURE 6 illustrates a deflating system similar to that of FIGURE 5, except that the hose 63 is longer than that shown in FIGURE 5 and is provided with a discharge end 66' which is positioned considerably below the extreme upper elevation of the hose afforded by the wire and pulley system. It is noted that this arrangement for suspending the hose taken in conjunction with its elongation results in a loop having a higher elevation than that of the discharge end. This provides a siphoning structure. The setting of the height of the upper reach of the loop relative to the height of the inflated dam will determine the point at which the water head will start deflating of the bag of the dam. Once the hose 63 is filled with discharging water a siphoning action is initiated and the discharge of water will continue until the bag of the dam has been emptied irrespective of water head conditions externally of the dam.

It has also been found that by placing an air valve (not shown) in the hose 63 at its upper elevation near point 65, the valve when closed will allow the siphoning process described above. However, should the valve be opened air will be allowed to flow into the hose 63 so that the assembly illustrated in FIGURE 6 will in effect become a gravity flow assembly similar to that illustrated in FIGURE 5.

Figure 7:
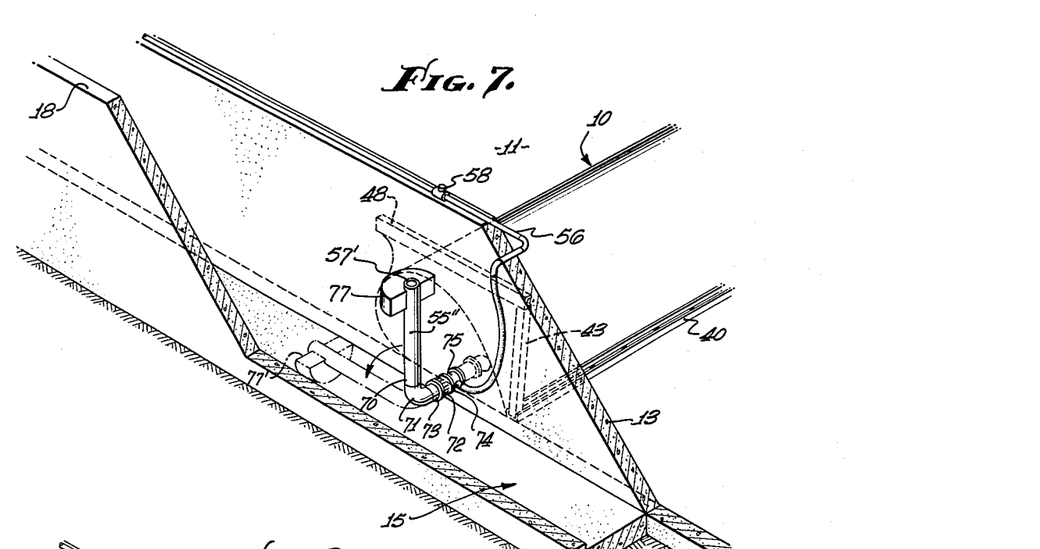
FIGURE 7 is illustrative of a fourth means of deflating the dam.

In FIGURE 7, the mechanism includes a standpipe 55" connected at its lower end 70 to an elbow joint 71 which is fitted into a swivel connection 72 at one end 73. At the other end 74 of the swivel connection is a pipe 75 leading through channel wall 13 into the bag 36.

The fluid inflating mechanism comprises water pipe 56 with valve 58, and a flexible hose 76 leading to the pipe 75. When the valve 58 is in an open position fluid will flow through fluid pipe 56 and hose 76 into pipe 75 and thence into the bag of the dam 10 causing it to fill and assume the tear drop cross section, as illustrated.

We next refer to the automatic deflating mechanism. At the upper end 57' of standpipe 55" a semi-circular pan 77 is positioned on the downstream side of the pipe 55", and when water is forced out the top 57' of the pipe 55", as described relative to FIGURE 1 above, it will fill the pan which when filled will act as a counterweight forcing the standpipe 55" on elbow joint 71 to pivot on swivel connection 72 from a vertical position to a horizontal position in the direction of the arrow shown in FIGURE 7. When the pipe 55" is in its horizontal position the water in the dam 10 will gravitationally flow out into the auxiliary channel 15.

Figure 8:
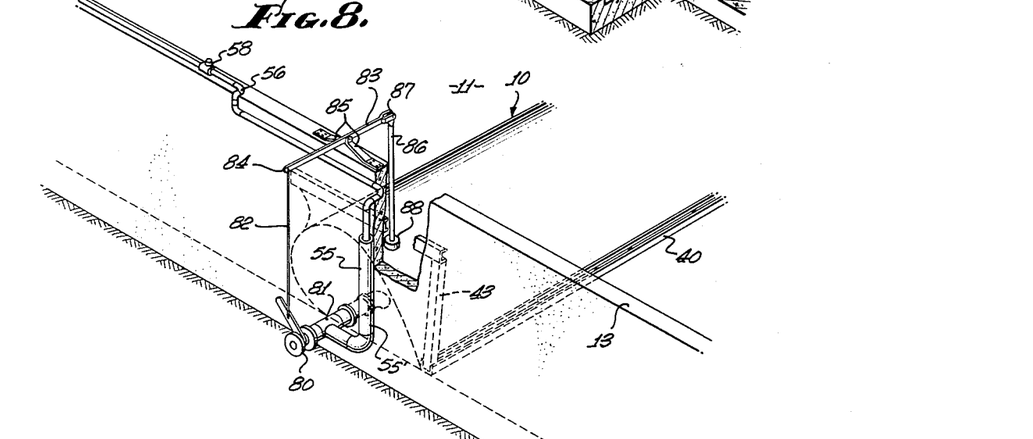
FIGURE 8 illustrates a fifth means of deflating the dam.

Referring to FIGURE 8, a relief valve 80 of common design is positioned on the floor of auxiliary channel 15 and is connected to a T joint 81 which leads through the wall 13 into the dam 10. The relief valve 80 is actuated by a rod 82 extending upward to a connection 84 with rocker arm 83. The rocker arm 83 is pivotally mounted in brackets 85 mounted on top of wall 13, and at the other end of the arm 83 a rod 86 is pivoted thereto at 87. Rod 86 extends downward into channel 11 generally parallel to the channel wall 13 and on the upstream side of the dam to a point where it terminates in a float 88, of cork or other buoyant material.

In operation as water rises behind the dam 10, at a predetermined height the water will engage the float 88 forcing it upward causing the rocker arm 83 to pivot in the brackets 85 and move the rod 82 which will open the relief valve 80 allowing the water in the bag to flow out through the valve.

Figure 9:
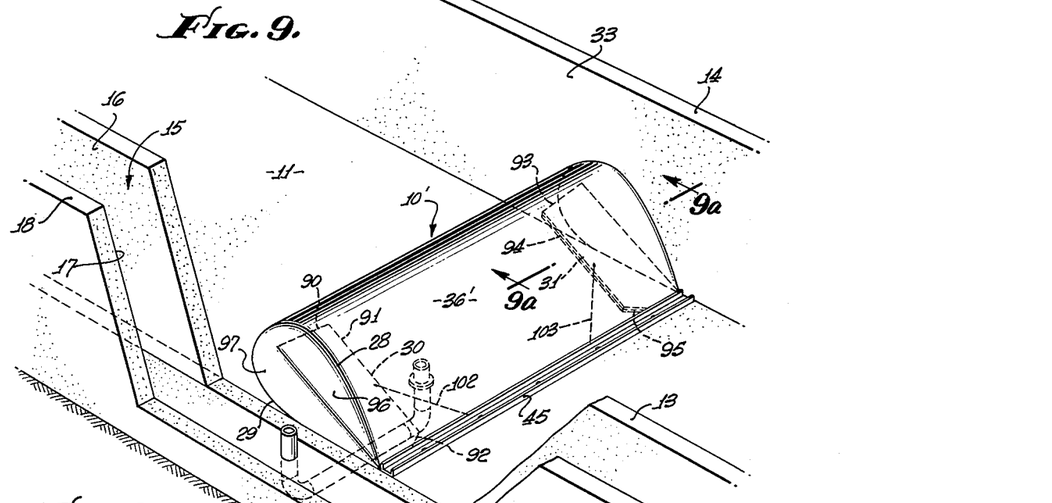
FIGURE 9 is a side perspective view showing a modification of the dam.
Figures 9A, 9B, 10:
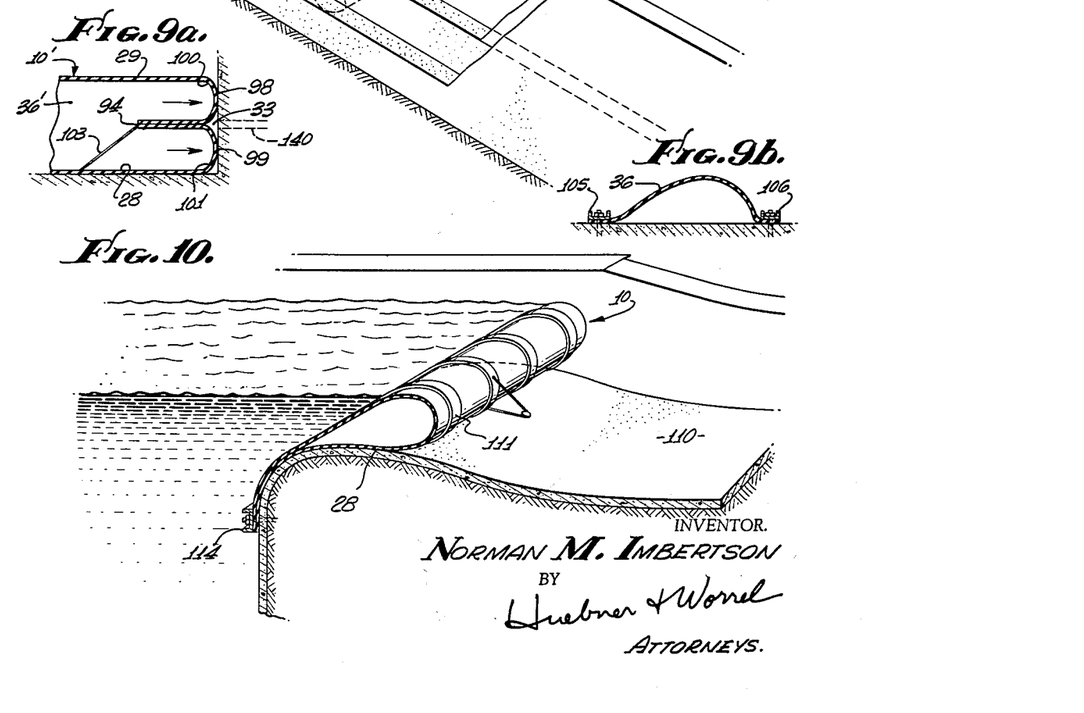
FIGURE 9a is a cross section taken on line 9a—9a of FIGURE 9.
FIGURE 9b is a cross section of a further modification of securing the dam to a water channel.
FIGURE 10 is a perspective view illustrating the use of my collapsible dam in water spillways.

A modified form of dam 10' is illustrated in FIGURES 9 and 9a. Herein the bag 36' is not secured to the channel walls but has inwardly tucked sealed ends providing a bag structure in which the end portions belly out against the opposite channel walls.

To accomplish this the sheet forming the bag is folded in the same manner as described relative to the structure of FIGURE 1, and the forward edges are clamped down to the bottom of the channel. However, the end extensions of the bag are sealed along their respective marginal edges 90, 91, 92, 93, 94 and 95 by vulcanizing or any other suitable means and are tucked into the space between the lower half 28 and the upper half 29. It has been found desirable, although not absolutely essential, to employ tie cords 102 and 103 secured at one end to the folded in edges of the bag and at the other end to an anchor such as the cleat 45. This expedient aids in preventing the bellied portions of the bag from expanding too far outwardly and destroying the partial seal or symmetry of the bag when inflated. When the dam of this particular form is employed there is formed at each end of the bag a minor upper compartment 100 (see FIGURE 9a) and a minor lower compartment 101, the end walls of which are forced in the direction of the arrows, and there is thus presented in effect a double seal between bag and channel wall as indicated at 98 and 99. In lieu of the tie chords 102 and 103, pipes 140 (shown in broken lines in FIGURE 9a) supplying a sufficient volume of water and positioned at space 33 can, by supplying water at this point under proper flow and head, turn the ends of the bag outside in relieving the above mentioned bellied end of the bag and adjusting the end to a desirable end seal.

FIGURE 9b illustrates a modification of the dam structure in which the bag element comprises a sheet the channel bottom ends of which are clamped to the bottom at separated transverse lines as by brackets 105 and 106. The spacing between the brackets is sufficiently less than the dimension between the edges referred to to provide for rising of the sheet material under inflation.

The modification embodied in FIGURE 10 is to illustrate a further use of the present invention and in conjunction therewith certain necessary modifications. It has been the practice heretofore when blocking or restraining water flowing from dams through their spillways to use taintor gates or drum gates in the spillways. The basic embodiment of the present collapsible dam can be substituted for taintor gates in spillways of dams to raise the reservoir level when required. The dam can be fastened to the spillway floor 110 at the desired location, being fastened at the front edge in the identical manner as shown in FIGURES 9 and 9a. Automatic or manual inflation and deflation equipment can be installed as before described. If the spillway section is designed with a forebay as shown, the fastened end of the bag could be at 114 in the forebay and the bag rolled into the forebay where it would be under water and out of the way when not in use, thus increasing the life by preventing freezing and thawing damage in cold countries and air deterioration in any country. The lower half 28 of the sheet is anchored together with an end of a strap 111. The opposite end of the straps can be pulled manually or mechanically to cause the empty bags to sink into the water when not in use. To get the bag back into the channel inflate with air and float, using additional mechanical help if required.

Figures 11, 12, 13:
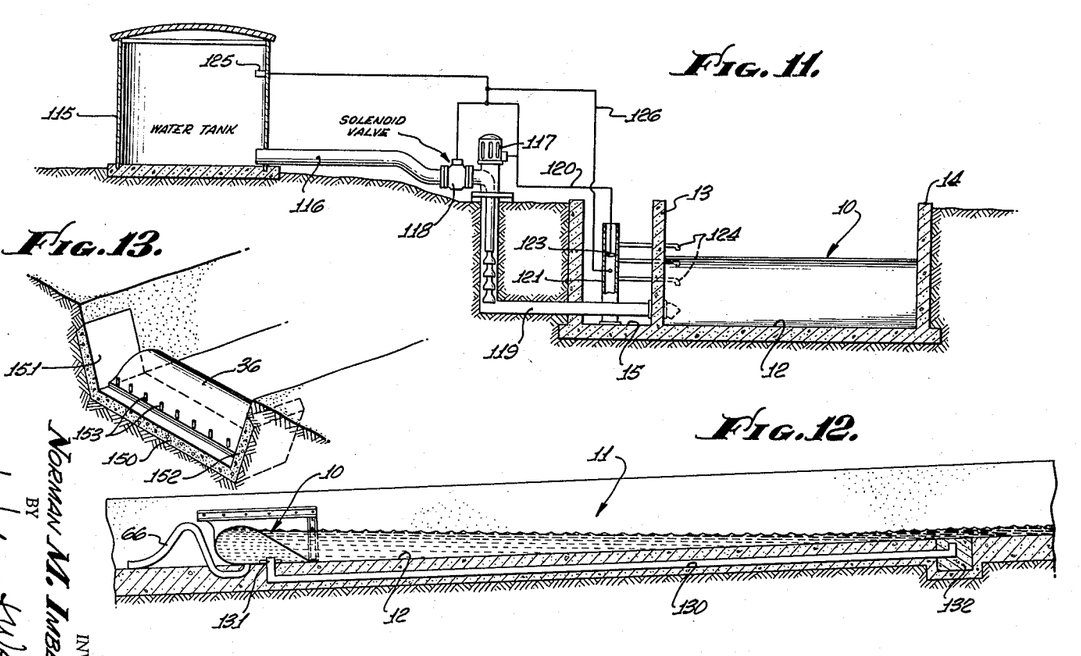
FIGURE 11 illustrates an automatic inflation and deflation system for the collapsible dam.
FIGURE 12 is a cross section of a water channel illustrating a further modified form of means for inflating the dam.
FIGURE 13 is a perspective view illustrating a cut-off wall to be used in an unpaved channel to anchor the collapsible dam.
Figure 14:
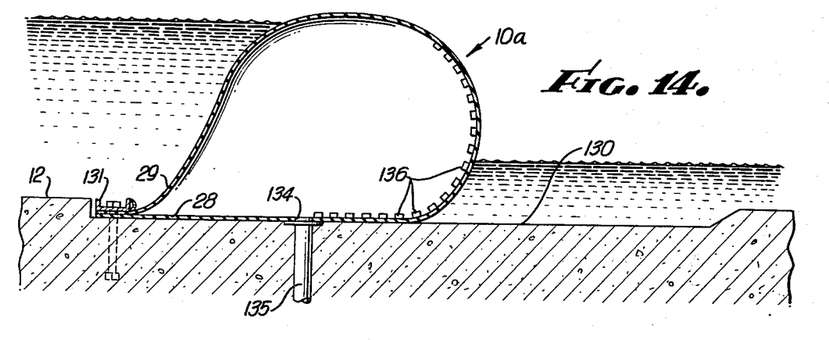
FIGURE 14 illustrates a dam mounting recess in a channel bottom with a collapsible dam mounted therein.

FIGURE 11 illustrates means and method for inflating and deflating the dam by a fully automatic operation.

A water tank 115 of sufficient capacity to contain the quantity of water necessary to fill the dam 10 is mounted at a sufficient elevation so that water can flow by gravity from the tank into the dam.

There are pipe connections 116 and 119 between the tank and the dam and a solenoid operated valve 118 as well as an electrically operated pump 117 interposed in the line.

There is provided a stilling well 121 situated upstream from the dam 10 in the auxiliary channel 15. Located in the well for vertical movement is a float actuated switch 123 of any conventional or suitable form responsive to the water level in the well. This switch should be of an adjustable character so that it can be caused to actuate at any one of various water levels. Such mechanisms are known.

Water gauge pipes 124 communicate between the water channel and the stilling well at successive heights whereby water from the channel will flow into the well depending upon the height of water in the channel.

Assuming the water tank 115 to be empty and the dam 10 to be inflated if and when the water level in the channel behind the dam reaches a predetermined height water will flow therefrom into the well and actuate the switch 123. This will close a conventional electrical circuit 120 which will open the solenoid valve 118 and simultaneously start the electric motor operated pump 117. Water will thus be pumped from the dam into the water tank. There will preferably be employed a conventional form of automatic shut off switch 125 to close the valve and turn off the motor when the dam has been emptied.

After the flood condition in the channel has receded and with it the water level in the well 121 has dropped the float actuated switch 123 drops to a lower actuating position which closes a circuit 126 independent of the motor circuit to open the valve 118 thereby permitting the water in the tank 115 to flow by gravity back into the dam.

The modification illustrated in FIGURE 12 of the drawings shows another means and method for filling the dam 10. In this embodiment a pipe 130 is positioned under the bottom 12 of the channel 11 with one end of the pipe 131 protruding upward from the bottom 12 and into the bag of the dam, and the other end of the pipe being located upstream and therefore at an elevation above the lower end, and terminating in a filter or gravel bed at 132 which communicates with an opening in the bottom of the channel. In operation a portion of the water flowing downstream will pass through the filter bed into the pipe 130 and flow downwardly thence into the dam inflating the bag thereof. With a simple siphon 66 as shown connected to the dam the siphon will deflate the dam, and the filter beds and pipe line will fill it, making the process completely automatic.

FIGURE 13 illustrates one means of securing bag 36 in a channel when the channel is unpaved. A cut-off wall 150, having extensions 151 and 152 rising upward from the plane of wall 150, is made of concrete or other suitable material which can be fitted across an unpaved channel. The cut-off wall 150 has bolts 153 embedded in the concrete to receive the bag 36 and channel section clamps.

Reference has been made to the desirability of reducing coefficient of friction of the flow of water over the collapsed dam 10. When there is an obstruction in the channel bottom 12 the onrushing water within the channel meeting this obstruction will cause an increased coefficient of friction with a consequent decrease in channel capacity, and this friction in some cases of critical velocity will create an undesirable hydraulic jump of the water. If this hydraulic jump is allowed to build up over a period of time due to the obstruction serious damage may result as the water proceeds down the water course or channel through a turbulent and unsteady flow caused by the jump.

Thus, in FIGURES 14 through 21, various forms of constructions and dam tiedowns are illustrated which will materially reduce the coefficient of friction of the flow of water over the collapsed dam. In order to produce this low coefficient of friction, the channel bottom 12 is provided with a cut-out portion or recess 130 which extends transversely across the channel bottom 12 from one wall to the other wall of the channel. The depth of the recess 130 is generally equal to the thickness of the lower half 28 and upper half 29 of the envelope 10a plus the height of the tiedown cleat 131 when the cleat is positioned over the two thicknesses 28 and 29. It should be noted that the overall height of the cleat 131 and double thickness of the envelope 10a is approximately 2 inches. The cleat 131 is similar to cleat 40, but differs in that it is provided on the forward leg 132 with a semi-circular extension 133 which will serve to protect the upper half 29 from becoming punctured at the point where the envelope 10a is mounted within the recess 130 when the envelope is inflated. The cleat 131 is firmly held down against the envelope material by threaded studs 41 securely embedded in the concrete bottom and projecting upwardly through registering apertures in the cleat 131, nuts 41' being theaded on the studs 41.

The modified envelope 10a illustrated in FIGURES 14, 15, 17 and 18 is provided with an opening 134 in the bottom half 28 of the envelope which is fitted over an inlet-outlet pipe 135, which in turn is mounted in the channel bottom 12 and projects up into the recess 131.

Figure 15:
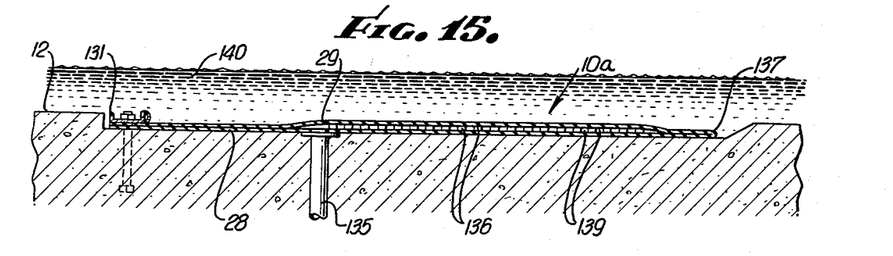
FIGURE 15 is a view similar to FIGURE 14, wherein the dam is collapsed.
Figure 16:
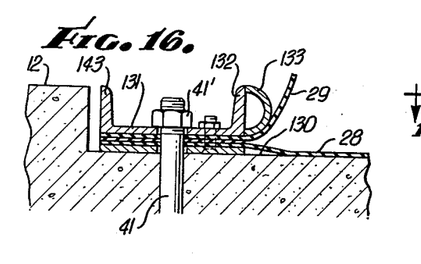
FIGURE 16 is an enlarged view of a modified dam tiedown cleat.
Figure 17:
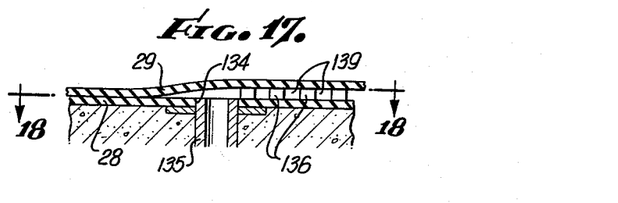
FIGURE 17 is an enlarged fragmentary view of a portion of the dam and fluid inlet-outlet.
Figure 18:
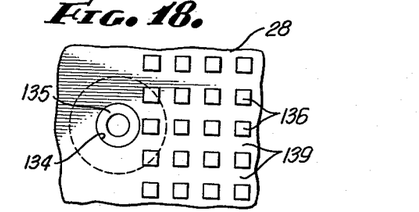
FIGURE 18 is a view taken on line 18—18 of FIGURE 17.

In order to assure a complete deflation of the envelope 10' as shown in FIGURE 15, the inside surface of the lower half 28 of the envelope 10' is provided with a plurality of spaced apart protuberances 136. These protuberances or spacers 136 extend the complete width of the envelope 10' and extend from a position adjacent the leading edge 137 of the deflated envelope 10' to the inlet-outlet pipe 135.

When the envelope 10a is deflated, the upper half 29 of the envelope 10a will be forced downward by the exterior water pressure into contact with the lower half 28 at the trailing edge 138 and will be spaced from the lower half 28 by the protuberances 136 as best seen in FIGURE 15. This construction will assure a complete emptying of the envelope 10a because the water that is forced to the leading endge 137 within the envelope 10a will have channels 139 formed between the protuberances 136 so that the water may be expelled out the inlet-outlet pipe 135. Also, the protuberances 136 serve the additional purpose of spacing the upper half 29 of the envelope 10' from the pipe 135 so that it will not be sealed off and closed by the external water pressure as it passes over the collapsed dam.

Thus it can be seen that with the provision of the recess 130 and the construction of the protuberances 136 within the envelope 10' the complete collapsed dam will offer little or no resistance to the water as it passes over it down the channel course. Generally speaking, the much smoother texture of the envelope 10a as compared with the cement surface of the channel bottom 12 will have the effect of reducing the opposition of the normally rough channel bottom to the flow of water. Such construction results in a reduced coefficient of friction of the water flow 140 and the surface profile of the water flow 140 will not be disturbed and there will be no undesired hydraulic jump.

Figure 19:
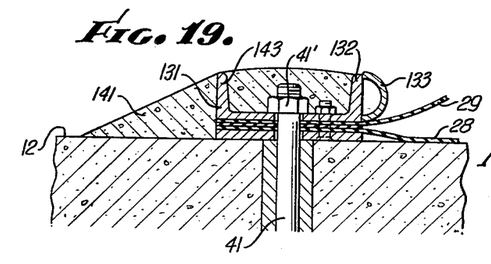
FIGURE 19 is a view similar to FIGURE 16 wherein the tiedown cleat has been streamlined by concrete to reduce the coefficient of friction of water passing over the cleat.

FIGURE 19 illustrates the use of concrete to streamline and reduce the obstruction of the cleat 131 which has been mounted in the channel bottom where there is no recess. In order to accomplish this streamlining, a sloping concrete ramp 141 is provided which abuts against the rearward leg 143 of the cleat 131 and the space between the forward leg 132 and rearward leg 143 is filled with concrete forming a continuous smooth line over the cleat 131. It should be noted that the overall height of the tiedown assembly when in position on the channel bottom 12 is approximately two inches in height. Thus, while there might be a slight rise as the water slides over the ramp portion 141, the coefficient of friction of the flow of water is not sufficiently increased to materially affect the usefulness of the collapsible dam when not mounted in a recess.

Figure 20:
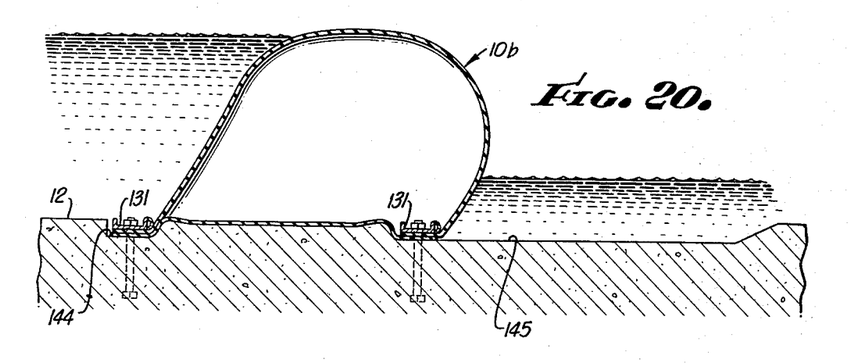
FIGURE 20 illustrates modified mounting recesses and tiedown means for a collapsible dam anchored at two positions.
Figure 21:
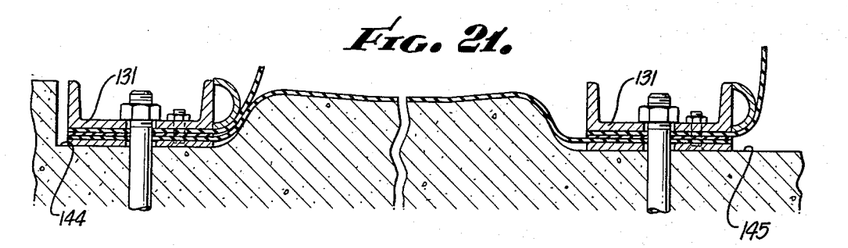
FIGURE 21 is an enlarged sectional view of the tiedowns in FIGURE 20.

FIGURES 20 and 21 illustrate a modified tiedown means for the envelope 10b wherein there is provided a rear recess 144 in the channel bottom 12 and a forward recess 145. This type of construction is utilized when it is desirable to anchor the envelope 10b at its trailing edge and near its leading edge. It has been found in some cases where there is a double tiedown such as illustrated in FIGURES 20 and 21, that by maintaining the center portion between the recesses 144 and 145 at the same or approximate height of the bottom 12, there is less of an obstacle to the flow of water because the downstream cleat will be mounted below the actual channel bottom surface 12 and there would be no chance of of a depression being created between the rear and forward tiedown cleat which might offer resistance to the flow of water.

Figures 22, 23:
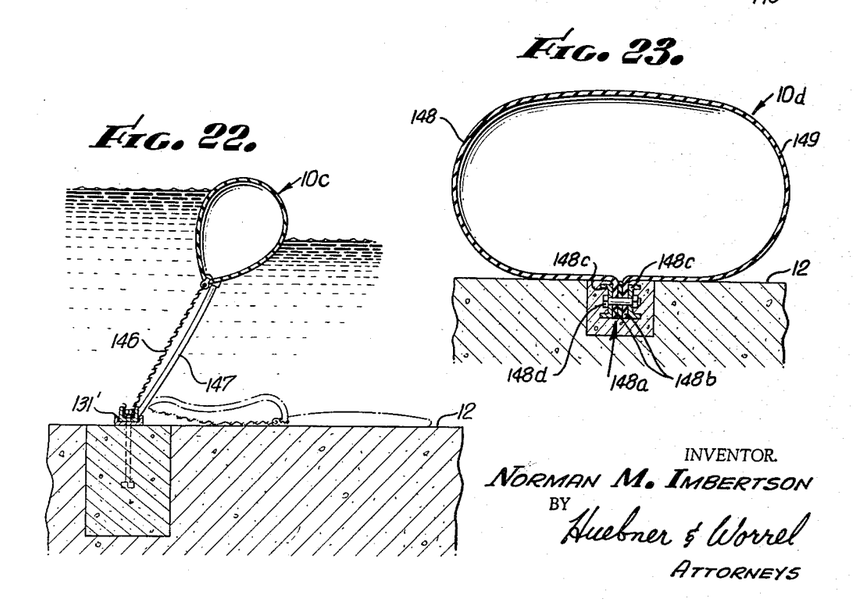
FIGURE 22 is a modified collapsible dam structure held to the channel bottom by a membrane.
FIGURE 23 is a further modified single tiedown dam of generally elliptical cross section.

The modified dam illustrated in FIGURE 22 can be easily installed in existing channels and includes a flexible membrane 146 which can be constructed of the same material as the envelope 10' having one edge attached to a cleat 131', and the other edge attached to the dam envelope 10c. The flexible membrane 146 will extend across the entire channel from wall to wall as would the envelope 10c. There is also provided a flexible inlet-outlet tube 147 which may be used in inflating and deflating the envelope 10'. As can be seen by FIGURE 22 when the envelope is deflated it will lie generally flat on the channel bottom 12 as illustrated by the phantom lines and when it is inflated it will rise to the surface of the water and form an obstruction to the water flow.

The collapsible dam illustrated in FIGURE 23 includes an envelope 10d which is generally elliptical in shape when inflated and being secured to the channel bottom 12 midway between the rear edge 148 and forward edge 149. The tiedown assembly 148a includes a pair of cleats 148b which grip the edges 148c of the envelope 10d and a bolt 148d which holds the assembly together. The assembly 148a is embedded in the concrete bottom 12. This particular type of dam differs from the heretofore described generally tear-drop shaped dam 10 and is adapted for use in conditions that require the control of water going in either direction in the channel. As can be seen from the illustration, with the tiedown 148a mounted between the edges 148 and 149, water may be interrupted at either of the edges 48 or 49. In this manner, as an illustration, water once passing over the dam 10'' from the front edge 149 may be retained in an area behind the rear edge 148 or vice versa.

Figure 24:
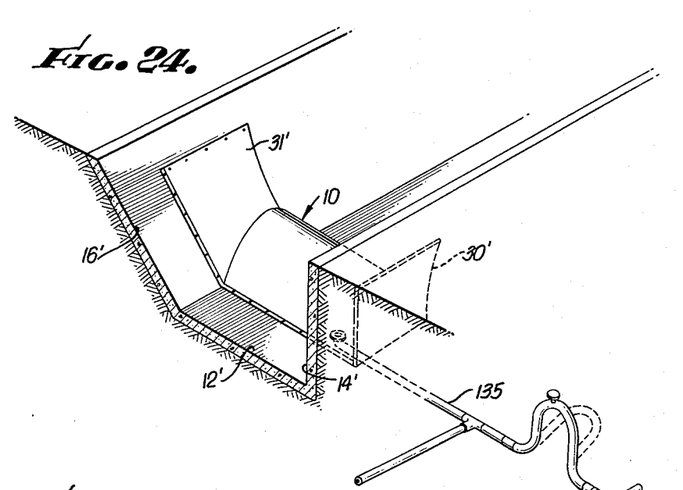
FIGURE 24 illustrates the use of the collapsible dam in a channel where one side wall is vertical and the opposite side wall is slanted.

FIGURES 24 through 27 illustrate the use of the collapsible dam 10 in water channels of differing configuration. FIGURE 24 illustrates a channel having a bottom 12'; a vertical side wall 14', and a sloping side wall 16'. The end extension 30' of the dam 10 is formed similarly to the extensions illustrated in FIGURES 1 and 2. However, the end extension 31' which is secured to the sloping walls 16' is generally of greater height than the end extension 30'. The mounting of the dam 10 illustrated in FIGURE 24 is accomplished in the same manner as that previously described where there are end extensions.

Figure 25:
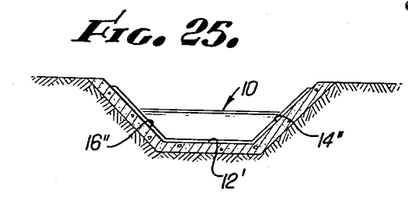
FIGURE 25 illustrates another channel cross section configuration and a dam mounted therein.

FIGURE 25 illustrates a water channel where both walls 14'' and 16'' slope so that the channel is narrower at the bottom 12' than at the top.

Figure 26:
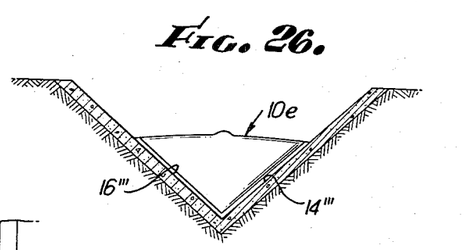
FIGURE 26 illustrates still another channel cross section configuration and a dam mounted therein.
Figure 27:
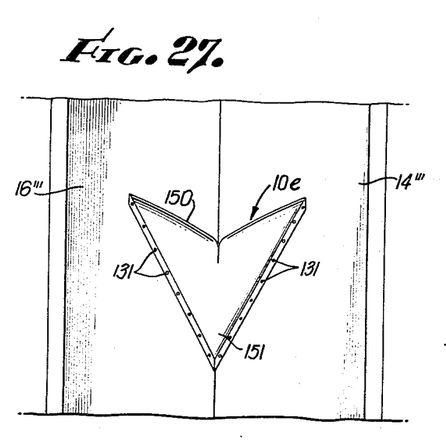
FIGURE 27 is a top plan view of the channel and dam shown in FIGURE 26.

The channel illustrated in FIGURES 26 and 27 is V-shaped in cross-section formed with walls 14''' and 16''' only. When utilizing a dam 10e in this type of a channel construction, the material of the bag 36 is folded generally triangular and positioned in the channel so that the trailing edge 150 is free and the leading edges 151 are mounted to the walls 14''' and 16''' by means of cleats 131.

Figure 28:
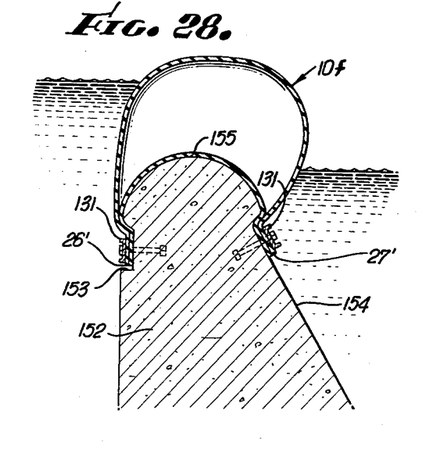
FIGURE 28 illustrates the use of the dam on a spillway or weir crest.
Figure 29:
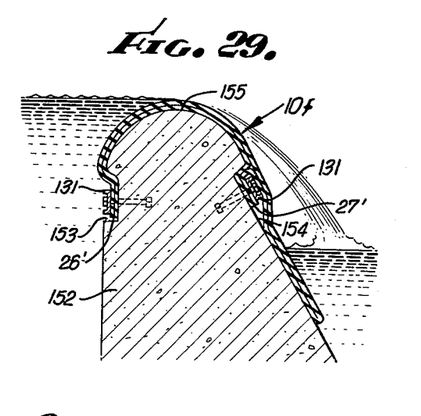
FIGURE 29 is a view similar to FIGURE 28 showing the dam in a collapsed position.

It has been found in certain cases where a spillway, weircrest or ogee dam has already been established, that it is desirable to raise the level of the water behind such structures. To accomplish this, the spillway 152 is provided with recess portions 153 and 154 to accommodate the edges 26' and 27' respectively of the envelope 10f. The edges 26' and 27' are held respectively to the spillway 152 by means of the cleats 131. As can be seen, the envelope 10f extends from the forward edge 26' over the top 155 of the spillway and down the rear side to the recess 154. It then may be inflated such as shown in FIGURE 28 or deflated such as shown in FIGURE 29, when it is desired that the water level behind the spillway be no higher than the top 155 of the spillway 152.

Figure 30:
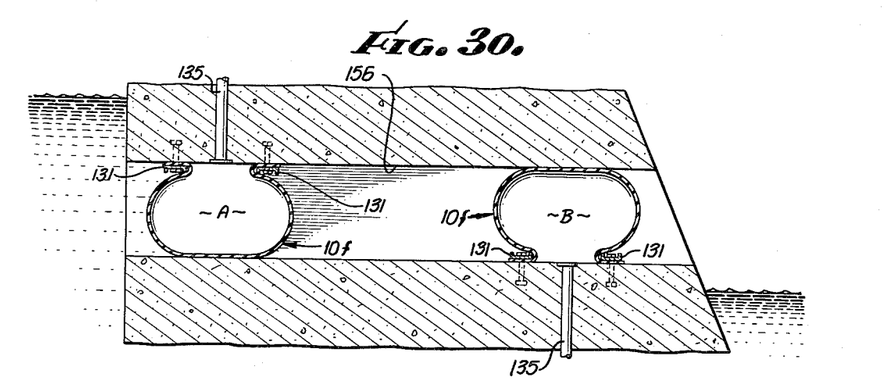
FIGURE 30 illustrates a pair of double tiedown collapsible dams mounted in a tunnel, culvert or sluiceway.

FIGURE 30 illustrates the use of the collapsible dam in a tunnel, culvert or dam sluiceway 156. The dam identified A is secured to the tunnel or culvert 156 at the top and the dam identified as B is secured to the tunnel or culvert at the bottom portion. In each instance an inlet-outlet pipe 135 communicates with the interior of the envelope 10f to assist in either filling the dam 10f or emptying it. This particular dam can be utilized when it is necessary and desirable to carry water from one area to another through a tunnel or closed passageway and where it is desirable to stop the flow of water altogether, or at least retard the flow.

Also, the above structure within a dam sluiceway will act as a valve in the sluiceway so that when deflated, debris backed up behind the dam may be passed through the sluiceway.

Figure 31:
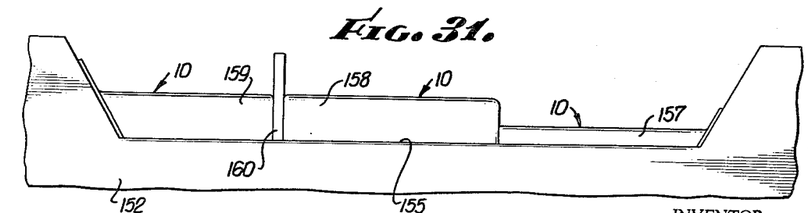
FIGURE 31 illustrates a plurality of collapsible dams in alignment, each independently capable of being deflated or inflated to the desired height.

FIGURE 31 illustrates the use of several envelopes 10 within a spillway or on top of an ogee dam 152 where it may be desired to change the respective level of the water by deflating one of the envelopes such as is illustrated by unit 157 while maintaining the other two units illustrated 158 and 159 at their full and inflated height. By this means, water then can pour over the unit 157 into the spillway and still maintain the level of the water higher than the top 155 of the spillway. This particular figure illustrates two means by which these units or sections may be positioned within the spillway. The units 157 and 158 are abutted together whereas units 158 and 159 are divided by a concrete pillar 160 to which the ends of the respective bags will abut.

Each of the units 157, 158 and 159 are independently operated as far as their inflation and deflation is concerned. It can thus be seen by this independent action that any combination of heights can be achieved. It is to be understood that while the illustration of FIGURE 31 shows the individual units atop a spillway 152, the same or similar construction may be utilized in a water course with the same or a greater or lesser number of individual sections.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus.

Having described my invention, what I claim as new and desire to secure by Letters Patent is:

1. A water course channel section and collapsible dam combination comprising: a dam channel section in a water course, said channel section embodying a generally transversely flat bottom, said bottom including a transverse portion of substantially hard nonyielding material having a plane surface for mounting a collapsible envelope thereon, an elongated substantially fluid impervious envelope extending transversely of said channel section, the envelope being formed from a sheet folded over with free edges coincident forming an upstream leading edge portion seating upon the mounting surface, means clamping said leading edge portion upon said mounting surface in intimate contact therewith along the entire length of said leading edge portion, said envelope trailing downstream from said edge portion mounting, fluid inlet and outlet means connected to said envelope whereby fluid may be passed into said envelope to inflate it, and out of said envelope to deflate it, said envelope when inflated providing a dam in operative relation to a body of water upstream of said envelope and when deflated collapsing to lay generally flat in inoperative relation to such water which will not materially decrease the flow of water but remaining permanently installed in said water course, the clamping mounting of said leading edge portion on said mounting surface being sufficiently watertight substantially to prevent water from flowing between said leading edge portion of the envelope and said mounting surface.

2. A water course channel section and collapsible dam combination as defined in claim 1 wherein said channel section includes upright side walls and said envelope is formed with ends which abut against said walls, projecting upwardly to lie against said side walls and forming auxiliary envelope sections, these sections being clamped along their leading edges to said side walls so that when said envelope is inflated said auxiliary envelope sections form bulges pressing against the respective contiguous end portions of the envelope to effect a continuous water barrier from one side of said channel section to the other.

3. A water confining structure and collapsible dam combination as defined in claim 2, wherein inwardly directed, spaced protuberances are provided on at least one fold of said sheet in relation to the other fold of said sheet to facilitate drainage of the fluid within said envelope.

4. A water confining structure and collapsible dam combination, comprising: a dam mounting portion on said water confining structure generally transverse to the flow of water, said dam mounting portion being of substantially hard non-yielding material having a transverse surface for mounting a collapsible envelope thereon, an elongated substantially fluid impervious envelope having means forming end closures and said envelope being formed from a sheet folded over with free edges coincident forming a mounting edge portion seating upon the mounting surface, means clamping said mounting edge portion upon said mounting surface in intimate contact therewith along the entire length of said mounting edge, said envelope trailing from said edge portion mounting, fluid inlet and outlet means connected to said envelope whereby fluid may be passed into said envelope to inflate it, and out of said envelope to deflate it, said envelope when inflated providing a dam in operative relation to a body of water behind said envelope and when deflated collapsing to lay generally flat in inoperative relation to such water which will not materially decrease the flow of water, but remaining permanently installed in said water course, the clamping mounting of said mounting edge portion on said dam mounting portion being sufficiently watertight substantially to prevent water from flowing between said mounting edge of the envelope and said dam mounting surface.

5. A water confining structure and collapsible dam combination as defined in claim 4 wherein said collapsible envelope is one of a series of elements disposed in abutting, transversely aligned relation and spanning the entire extent of said dam mounting portion.

6. A water confining structure and collapsible dam combination as defined in claim 5 wherein said collapsible envelope is mounted in end-to-end relation with at least one other collapsible envelope.

7. A water course channel section and collapsible dam combination comprising: a dam channel section in a water course, said channel section embodying a generally transversely flat bottom and upright sides, said bottom including a transverse portion of substantially hard non-yielding material having a plane surface for mounting a collapsible envelope thereon, and said sides providing confining walls for the ends of said envelope, an elongated substantially fluid impervious envelope of pliable stretch resistant sheet material extending transversely of said channel section, the envelope being formed with an upstream leading edge portion seating upon the mounting surface, means clamping said leading edge portion upon said mounting surface in intimate contact therewith along the entire length of said leading edge portion, said envelope trailing downstream from said edge portion mounting, the ends of said envelope being sealed and tucked inwardly within the envelope toward each other, and means for retaining the ends in tucked relationship, and said ends abutting against said confining walls, fluid inlet and outlet means connected to said envelope whereby fluid may be passed into said envelope to inflate it and out of said envelope to deflate it, said envelope when inflated providing a dam in operative relation to a body of water upstream of said envelope and when deflated collapsing to lay generally flat in inoperative relation to such water which will not materially retard the flow of water but remaining permanently installed in said water course, the clamping mounting of said leading edge portion on said mounting surface being sufficiently watertight substantially to prevent water from flowing between said leading edge portion of the envelope and said mounting surface.

References Cited by the Examiner

UNITED STATES PATENTS

| | | | |
|---|---|---|---|
| 552,063 | 12/95 | Jones | 61—27 |
| 799,569 | 9/05 | Jenkins | 61—22 |
| 840,811 | 1/07 | Vestal | 61—22 |
| 921,513 | 5/09 | Crawford | 61—22 |
| 1,211,085 | 1/17 | Chandler | 61—22 |
| 1,986,113 | 1/35 | Lun | 61—27 |
| 2,609,666 | 9/52 | Mesnager | 61—30 |

FOREIGN PATENTS

| | | |
|---|---|---|
| 33,367 | 10/31 | Norway. |
| 601,722 | 12/25 | France. |
| 1,064,129 | 12/53 | France. |

EARL J. WITMER, *Primary Examiner.*

WILLIAM I. MUSHAKE, JACOB N. NACKENOFF, *Examiners.*